US012731427B2

(12) United States Patent
Saha et al.

(10) Patent No.: US 12,731,427 B2
(45) Date of Patent: Sep. 8, 2026

(54) SYSTEMS AND METHODS FOR SERIALIZING DATA EXTRACTED FROM DATA OBJECTS

(71) Applicant: Optum, Inc., Minnetonka, MN (US)

(72) Inventors: Saumajit Saha, Bangalore (IN); Prakhar Mishra, Gurgaon (IN); Atul Singh, Bangalore (IN); Kunal Suri, Greater Noida (IN)

(73) Assignee: Optum, Inc., Minnetonka, MN (US)

( * ) Notice: Subject to any disclaimer, the term of this patent is extended or adjusted under 35 U.S.C. 154(b) by 276 days.

(21) Appl. No.: 18/508,412

(22) Filed: Nov. 14, 2023

(65) Prior Publication Data

US 2025/0157241 A1 May 15, 2025

(51) Int. Cl.

*G06V 30/413* (2022.01)
*G06F 16/35* (2019.01)
*G06V 30/414* (2022.01)

(52) U.S. Cl.

CPC ............ *G06V 30/413* (2022.01); *G06F 16/35* (2019.01); *G06V 30/414* (2022.01)

(58) Field of Classification Search

CPC ..... G06V 30/413; G06V 30/414; G06F 16/35
See application file for complete search history.

(56) References Cited

U.S. PATENT DOCUMENTS

| | | | | |
|---|---|---|---|---|
| 10,417,516 | B2 | 9/2019 | Reinpoldt, III | |
| 10,423,851 | B2 | 9/2019 | Tallman et al. | |
| 10,990,814 | B2 | 4/2021 | Venkateswaran et al. | |
| 2009/0092318 | A1* | 4/2009 | Berard ................. | G06V 10/987 382/176 |
| 2016/0314104 | A1* | 10/2016 | Phillips ................. | G06F 40/151 |
| 2019/0065882 | A1* | 2/2019 | Reinpoldt, III ...... | G06V 30/412 |
| 2019/0340240 | A1* | 11/2019 | Duta ...................... | G06V 30/15 |
| 2022/0067360 | A1* | 3/2022 | Reynolds ............. | G06V 30/414 |
| 2022/0318224 | A1 | 10/2022 | Thompson et al. | |
| 2022/0319219 | A1* | 10/2022 | Tsibulevskiy ........... | G06F 18/40 |

* cited by examiner

*Primary Examiner* — Stephen S Hong
(74) *Attorney, Agent, or Firm* — Bookoff McAndrews, PLLC

(57) ABSTRACT

Disclosed are systems and methods for detecting a table from a document, classifying each cell of the table as one of: a value cell, a row header cell, or a column header cell, and performing a bounding box elongation operation to match each cell that is classified as a value cell to a first corresponding cell that is identified as a row header cell and a second corresponding cell that is identified as a column header cell. For each cell classified as a value cell, a data tuple is generated comprising a row header element, a column header element, and a value element, wherein the row header element corresponds to a first value in the first corresponding cell, the column header element corresponds to a second value in the second corresponding cell, and the value element corresponds to a third value in the value cell.

20 Claims, 10 Drawing Sheets

| Date | Temp (97.8 - 99) | Sp02 (95 - 100) | 02 Flow (0 - 20) |
|---|---|---|---|
| 01/02/2022 20:00 | | 93 L | |
| 01/02/2022 19:50 | | 97 | 31/min |
| 01/02/2022 15:52 | 97.7 L | 95 | 31/min |
| 01/02/2022 15:07 | | 95 | 31/min |
| 01/02/2022 07:18 | | 96 | 51/min |
| 01/02/2022 2:42 | 97.7 L | 92 L | |
| 01/02/2022 00:00 | | 92 L | |
| 01/01/2022 20:17 | | 96 | 51/min |
| 01/01/2022 20:00 | | 93 L | |
| 01/01/2022 17:11 | 97.7 L | 92 L | |
| 01/01/2022 13:05 | | 94 L | 51/min |
| 01/01/2022 12:00 | | 94 L | |

| Date | Temp (97.8 - 99) | SpO2 (95 - 100) | O2 Flow (0 - 20) |
|---|---|---|---|
| 01/02/2022 20:00 | | 93 L | |
| 01/02/2022 19:50 | | 97 | 31/min |
| 01/02/2022 15:52 | 97.7 L | 95 | 31/min |
| 01/02/2022 15:07 | | 95 | 31/min |
| 01/02/2022 07:18 | | 96 | 51/min |
| 01/02/2022 2:42 | 97.7 L | 92 L | |
| 01/02/2022 00:00 | | 92 L | |
| 01/01/2022 20:17 | | 96 | 51/min |
| 01/01/2022 20:00 | | 93 L | |
| 01/01/2022 17:11 | 97.7 L | 92 L | |
| 01/01/2022 13:05 | | 94 L | 51/min |
| 01/01/2022 12:00 | | 94 L | |

| Date | Temp (97.8 - 99) | Sp02 (95 - 100) | 02 Flow (0 - 20) |
|---|---|---|---|
| 01/02/2022 20:00 | | 93 L | |
| 01/02/2022 19:50 | | 97 | 31/min |
| 01/02/2022 15:52 | 97.7 L | 95 | 31/min |
| 01/02/2022 15:07 | | 95 | 31/min |
| 01/02/2022 07:18 | | 96 | 51/min |
| 01/02/2022 2:42 | 97.7 L | 92 L | |
| 01/02/2022 00:00 | | 92 L | |
| 01/01/2022 20:17 | | 96 | 51/min |
| 01/01/2022 20:00 | | 93 L | |
| 01/01/2022 17:11 | 97.7 L | 92 L | |
| 01/01/2022 13:05 | | 94 L | 51/min |
| 01/01/2022 12:00 | | 94 L | |

330

| Date | Temp (97.8 - 99) | SpO2 (95 - 100) | O2 Flow (0 - 20) |
|---|---|---|---|
| 01/02/2022 20:00 | | 93 L | |
| 01/02/2022 19:50 | | 97 | 31/min |
| 01/02/2022 15:52 | 97.7 L | 95 | 31/min |
| 01/02/2022 15:07 | | 95 | 31/min |
| 01/02/2022 07:18 | | 96 | 51/min |
| 01/02/2022 2:42 | 97.7 L | 92 L | |
| 01/02/2022 00:00 | | 92 L | |
| 01/01/2022 20:17 | | 96 | 51/min |
| 01/01/2022 20:00 | | 93 L | |
| 01/01/2022 17:11 | 97.7 L | 92 L | |
| 01/01/2022 13:05 | | 94 L | 51/min |
| 01/01/2022 12:00 | | 94 L | |

360

| Date | Temp (97.8 - 99) | Sp02 (95 - 100) | 02 Flow (0 - 20) |
|---|---|---|---|
| 01/02/2022 20:00 | | 93 L | |
| 01/02/2022 19:50 | | 97 | 31/min |
| 01/02/2022 15:52 | 97.7 L | 95 | 31/min |
| 01/02/2022 15:07 | | 95 | 31/min |
| 01/02/2022 07:18 | | 96 | 51/min |
| 01/02/2022 2:42 | 97.7 L | 92 L | |
| 01/02/2022 00:00 | | 92 L | |
| 01/01/2022 20:17 | | 96 | 51/min |
| 01/01/2022 20:00 | | 93 L | |
| 01/01/2022 17:11 | 97.7 L | 92 L | |
| 01/01/2022 13:05 | | 94 L | 51/min |
| 01/01/2022 12:00 | | 94 L | |

480

('01/02/2022 20:00', '93 L', 'Spo2 [95 - 100]')
('01/02/2022 19:50', '97', 'Spo2 [95 - 100]')
('01/02/2022 19:50', '31/min', '02 Flow [0 - 20]')
('01/02/2022 15:52', '97.7 L', 'Temp [97.8 - 99]')
('01/02/2022 15:52', '95', 'Spo2 [95 - 100]')
('01/02/2022 15:52', '31/min', '02 Flow [0 - 20]')
('01/02/2022 15:07', '95 L', 'Spo2 [95 - 100]')
('01/02/2022 15:07', '31/min', '02 Flow [0 - 20]')
('01/02/2022 07:18', '96', 'Spo2 [95 - 100]')
('01/02/2022 07:18', '51/min', '02 Flow [0 - 20]')
('01/02/2022 02:42', '97.7 L', 'Temp [97.8 - 99]')
('01/02/2022 02:42', '92 L', 'Spo2 [95 - 100]')
('01/02/2022 00:00', '92 L', 'Spo2 [95 - 100]')
('01/02/2022 20:17', '96 L', 'Spo2 [95 - 100]')
('01/02/2022 20:17', '51/min', '02 Flow [0 - 20]')
('01/02/2022 20:00', '93 L', 'Spo2 [95 - 100]')
('01/02/2022 17:11', '97.7 L', 'Temp [97.8 - 99]')
('01/02/2022 17:11', '92 L', 'Spo2 [95 - 100]')
('01/02/2022 13:05', '94 L', 'Spo2 [95 - 100]')
('01/02/2022 13:05', '51/min', '02 Flow [0 - 20]')
('01/02/2022 12:00', '94 L', 'Spo2 [95 - 100]')

SYSTEMS AND METHODS FOR SERIALIZING DATA EXTRACTED FROM DATA OBJECTS

FIELD OF DISCLOSURE

The present disclosure relates generally to the optimization of document processing. In particular, this application relates to capturing and extracting tabular data in a structured and usable format.

BACKGROUND

Document processing often comprises using optical character recognition (OCR) techniques to convert images of typed, handwritten, or printed text into machine-encoded text. Document processing and OCR technologies have emerged as vital tools in numerous industries, including the healthcare sector. These technologies promise to automate the extraction of information from documents, thereby streamlining workflow, reducing manual effort, and enhancing data accessibility and utility. Despite the significant advancements, current document processing and OCR methods face substantial challenges that often result in sub-optimal performance, especially when extracting information from tabular data.

Many conventional OCR systems primarily focus on the recognition of individual characters and words, often neglecting the overall document structure and layout. This approach tends to overlook the significance of spatial relationships, formatting elements, and visual hierarchies that provide context to the document's contents, such as tables. Consequently, these systems may misinterpret the role and relevance of rows and columns in tabular data. Consequently, processing tabular data often produces messy, illegible, or incoherent outputs.

Therefore, there is a need for improved document processing and OCR methods to extract tabular data from documents in a structured and usable format.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The present disclosure solves the problems described above or elsewhere in the present disclosure and improves the state of conventional healthcare applications. The present disclosure teaches systems and methods for document processing.

In some aspects, the techniques described herein relate to a computer-implemented method for extracting tabular data from a document including: detecting, by one or more processors, a table from a document; extracting, by the one or more processors, information about the table from the document; identifying, by the one or more processors, cells within the table, each cell including a bounding box; classifying, by the one or more processors, each cell as one of: a value cell, a row header cell, or a column header cell; performing, by the one or more processors, a bounding box elongation operation to match each cell that is classified as a value cell to a first corresponding cell that is identified as a row header cell and a second corresponding cell that is identified as a column header cell; for each cell classified as a value cell, generating, by the one or more processors, a data tuple including a row header element, a column header element, and a value element, wherein the row header element corresponds to a first value in the first corresponding cell, the column header element corresponds to a second value in the second corresponding cell, and the value element corresponds to a third value in the value cell; and storing, by the one or more processors, the data tuple for each cell classified as a value cell in a database.

In some aspects, the techniques described herein relate to a system for extracting tabular data from a document, the system including: at least one memory storing instructions; and at least one processor executing the instructions to perform operations including: detecting a table from a document; extracting information about the table from the document; identifying cells within the table, each cell including a bounding box; classifying each cell as one of: a value cell, a row header cell, or a column header cell; performing a bounding box elongation operation to match each cell that is classified as a value cell to a first corresponding cell that is identified as a row header cell and a second corresponding cell that is identified as a column header cell; for each cell classified as a value cell, generating a data tuple including three elements: a row header element, a column header element, and a value element; wherein the row header element corresponds to a first value in the first corresponding cell, the column header element corresponds to a second value in the second corresponding cell, and the value element corresponds to a third value in the value cell; and storing the data tuple for each cell classified as a value cell in a database.

In some aspects, the techniques described herein relate to a non-transitory computer readable medium storing instructions which, when executed by one or more processors, cause the one or more processors to perform operations including: detecting a table from a document; extracting information about the table from the document; identifying cells within the table, each cell including a bounding box; classifying each cell as one of: a value cell, a row header cell, or a column header cell; performing a bounding box elongation operation to match each cell that is classified as a value cell to a first corresponding cell that is identified as a row header cell and a second corresponding cell that is identified as a column header cell; for each cell classified as a value cell, generating a data tuple including three elements: a row header element, a column header element, and a value element; wherein the row header element corresponds to a first value in the first corresponding cell, the column header element corresponds to a second value in the second corresponding cell, and the value element corresponds to a third value in the value cell; and storing the data tuple for each cell classified as a value cell in a database.

BRIEF DESCRIPTION OF DRAWINGS

The accompanying drawings, which are incorporated in and constitute a part of this specification, illustrate various example embodiments and together with the description, serve to explain the principles of the disclosed embodiments.

DETAILED DESCRIPTION

Figure 1:
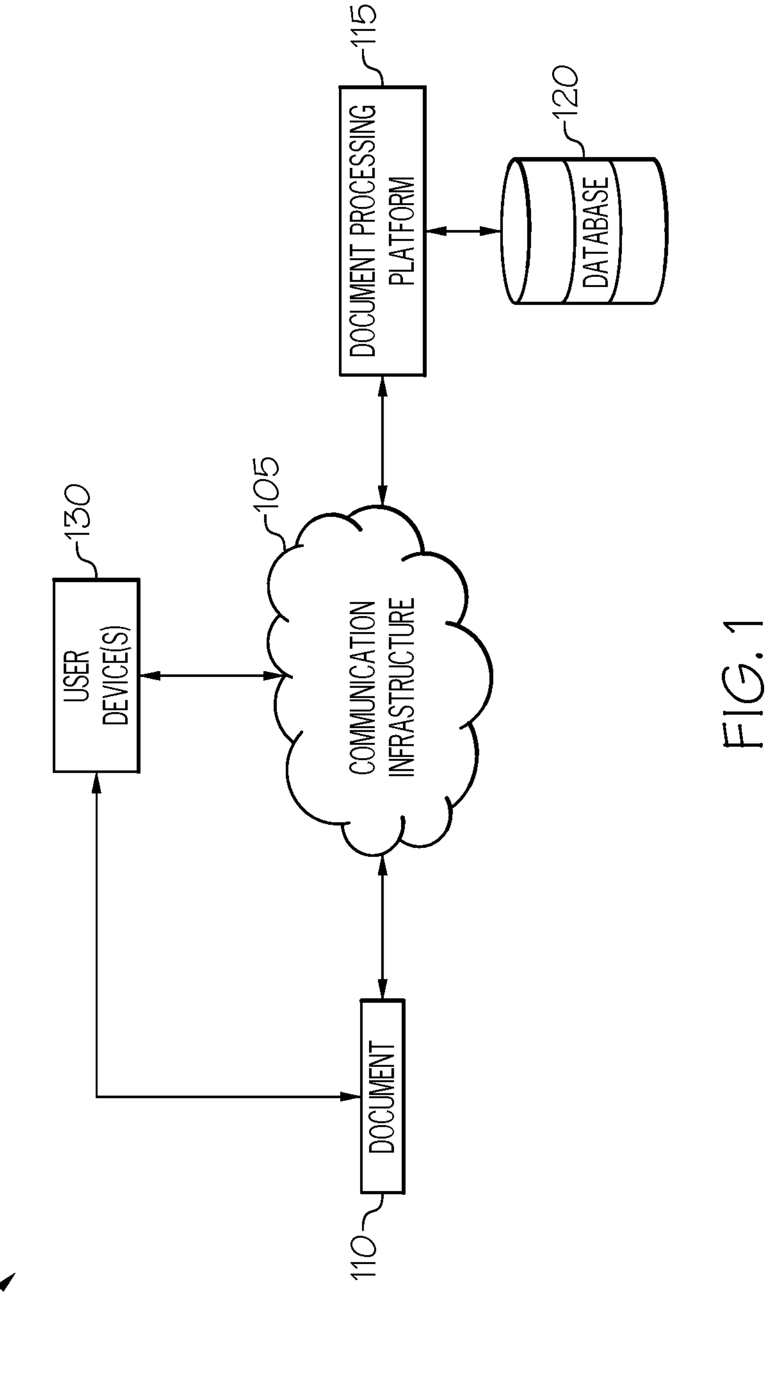
FIG. 1 is a diagram showing an example of a system configured for document processing, according to some embodiments of the disclosure.

Various embodiments of this disclosure relate generally to techniques for text prediction, and, more particularly, to systems and methods for processing a document by resolving section and layout conflicts to output higher quality and more accurate optical character recognition data.

As previously discussed, despite advancements in document processing and optical character recognition techniques, conventional methods still face certain limitations and challenges. One of these challenges involves adequately extracting tabular data from documents. The intricacies of spatial relationships of tabular data can often lead to errors and inaccuracies in the extracted information. Furthermore, the complex and resource-intensive nature of traditional OCR techniques can result in significant computational power and memory requirements. Additionally, these traditional approaches often lack the capability to handle variations and anomalies in real-world documents, leading to suboptimal performance and poor accuracy rates.

In view of the limitations of conventional methodologies, the techniques disclosed herein aim to substantially enhance the ability to process, understand, and extract information from documents, with particular effectiveness in the context of complex documents including tabular data.

The system and methods disclosed herein demonstrate significant technical improvements over conventional document processing and OCR techniques. The systems and methods disclosed herein are evaluated based on three metrics: Precision, Recall, and the F1 score, which is a harmonic mean of precision and recall. Higher values in each of these metrics signify better performance. The techniques disclosed in the present disclosure provides a high precision rate of 99.51% in overall tables, demonstrating an improvement in accuracy when identifying values in a table. Additionally, the techniques of the present disclosure also lead to a significantly high recall rate of 97.31%, showing improved effectiveness in identifying all the relevant values in a table. This balance of high precision and high recall leads to a superior F1 score of 98.19%, which represents a significant improvement over the prior art, which is prone to loss of semantic format information when parsing tabular data. For unbordered tables, precision, recall and F1-score in test performances arrive at 100% across the board.

Furthermore, the extracted table data may be output in a serialized data set in the form of tuples comprising the triplet set <row header, value, column header>, allowing for improved data transfer and storage in a database. For example, a table may contain two entities such as blood oxygen saturation (SpO2) and body mass index (BMI) measured over the course of ten days. BMI may have been measured every day for the ten days, while SpO2 was measured only two times over the ten day period. The serialized data set would have ten data triplets for BMI with a format <Date, Value, BMI> with value being the measured BMI on a corresponding date, and the serialized data set would have just two data triplets for SpO2 with a format <Date, Value, SpO2>, with the value being the measured SpO2 on a corresponding date. In a conventional data processing system, converting the table to a tabular data structure would result in a data structure that included ten rows each for BMI and SpO2. Thus, serializing the data set into triplet tuples improves the computational efficiency and resource intensity associated with data extraction and processing by reducing the number of data sets extracted (e.g., from ten for SpO2 to two), and removing the additional step present in the conventional techniques of filtering for only non-null values for SpO2. These triplets can be later fed to one or more machine learning models to build, for example, knowledge graphs out of the table, solve question-answering tasks based on the table information, and other advantageous downstream functionalities. This is a significant advantage over feeding raw text chunks produced by conventional OCR techniques of parsing tabular data.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are examples and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

FIG. 1 is a diagram showing an example of a system configured for document processing, according to some embodiments of the disclosure. Looking at FIG. 1, a network environment for processing and analyzing one or more documents is represented, conforming to an embodiment of the present invention. The network environment 100 incorporates a communication infrastructure 105, a collection of one or more documents 110, a document processing platform 115, a database (or data storage) 120, and one or more user devices 130.

In one embodiment, various components of the network environment 100 interact with each other through the communication infrastructure 105. The communication infrastructure 105 backs a range of different communication protocols and techniques. In one embodiment, the communication infrastructure 105 facilitates the document processing platform 115 to communicate with one or more other systems, including the collection of one or more documents 110, which in certain embodiments, is stored on a distinct platform and/or system. The communication infrastructure 105 of the network environment 100 includes one or more networks such as a data network, a wireless network, a telephony network, or any combination thereof. It is contemplated that the data network can be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network could be, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

The collection of one or more documents 110, in some embodiments, consists of one or several documents, which can take various forms, such as text-based content, images, audio, or video, and can be stored in a variety of formats, such as plain text, PDF, HTML, XML, or other structured or unstructured data formats. In one embodiment, the documents relate to the medical industry, such as documents which contain information related to medical treatment and diagnosis of patients. The collection of one or more documents 110 can be managed and stored on one or more devices within the network environment 100, such as local or remote file servers, cloud-based storage services, or other forms of data repositories.

The one or more user devices 130 are configured to enable a user to access and/or interact with other systems in the environment 100. For example, the user device 130 is a computer system such as, for example, a desktop computer, a mobile device, a tablet, a wearable device such as a fitness tracker, smart watch, etc. In some embodiments, the user device 130 includes one or more electronic application(s), e.g., a program, browser, etc., installed on a memory of the user device 130. In some embodiments, the electronic application(s) enable a user to interact with one or more of the other components in the environment 100. For example, the electronic application(s) includes a browser or application configured to receive and display output data. The one or more user devices 130 may be configured to provide documents 110 to the document processing platform 115 via communication infrastructure 105, and to receive and display processed data and outputs from the document processing platform 115, and furthermore to perform various use cases discussed in this disclosure.

The document processing platform 115 can include various software applications, frameworks, or libraries that enable document structure identification techniques to be applied to the documents 110, such as table detection.

In some embodiments, the document processing platform 115 is a platform with multiple interconnected modules. The document processing platform 115 includes one or more servers, intelligent networking devices, computing devices, components, and corresponding software for processing one or more documents 110. In addition, it is noted that the document processing platform 115 can be a separate entity of the system.

The database 120 is used to support the storage and retrieval of data related to the collection of one or more documents 110, storing metadata about the documents 110, such as author, date, and content type, as well as any extracted information from the document processing platform 115. The database 120 can consist of one or more systems, such as a relational database management system (RDBMS), a NoSQL database, or a graph database, depending on the requirements and use cases of the network environment 100.

In one embodiment, the database 120 is any type of database, such as relational, hierarchical, object-oriented, and/or the like, wherein data are organized in any suitable manner, including data tables or lookup tables. In one embodiment, the database 120 accesses or includes any suitable data that are utilized to identify document structure. In one embodiment, the database 120 stores content associated with one or more system and/or platform, such as the document processing platform 115 and manages multiple types of information that provide means for aiding in the content provisioning and sharing process. The database 120 includes various information related to documents, topics, and the like. It is understood that any other suitable data can be included in the database 120.

In one embodiment, the database 120 includes a machine-learning based training database with a pre-defined mapping defining a relationship between various input parameters and output parameters based on various statistical methods. For example, the training database includes machine-learning algorithms to learn mappings between input parameters related to the documents 110. In an embodiment, the training database is routinely updated and/or supplemented based on machine-learning methods.

The document processing platform 115 communicates with other components of the communication infrastructure 105 using well known, new or still developing protocols. In this context, a protocol includes a set of rules defining how the network nodes within the communication infrastructure 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers.

In operation, the network environment 100 provides a framework for processing and analyzing large amounts of document content, leveraging the capabilities of document structure detection and database technologies to support a wide range of use cases and applications. For example, the network environment 100 can also be used to extract information from the documents 110, or to process structures within one or more documents 110.

To support the storage and retrieval of data related to the document 110, the database 120 can be used to store metadata about the documents 110, such as author, date, and content type. The database 120 can also be used to store any extracted information from the document processing platform 115, such as section information or layout details identified in the documents 110.

In addition to the aforementioned use cases, the network environment 100 can be used to support a wide range of other applications and tasks, such as search and recommendation systems, text summarization, and data visualization. For instance, the network environment 100 can be utilized to construct a search engine that allows users to search for particular keywords or phrases within one or more documents 110, returning a list of relevant documents and information about the contexts in which the keywords or phrases appear. The network environment 100 may also be utilized to prepare graphical representations of data within the one or more documents 110, such as data found in tables within the one or more documents 110.

Figure 2A:
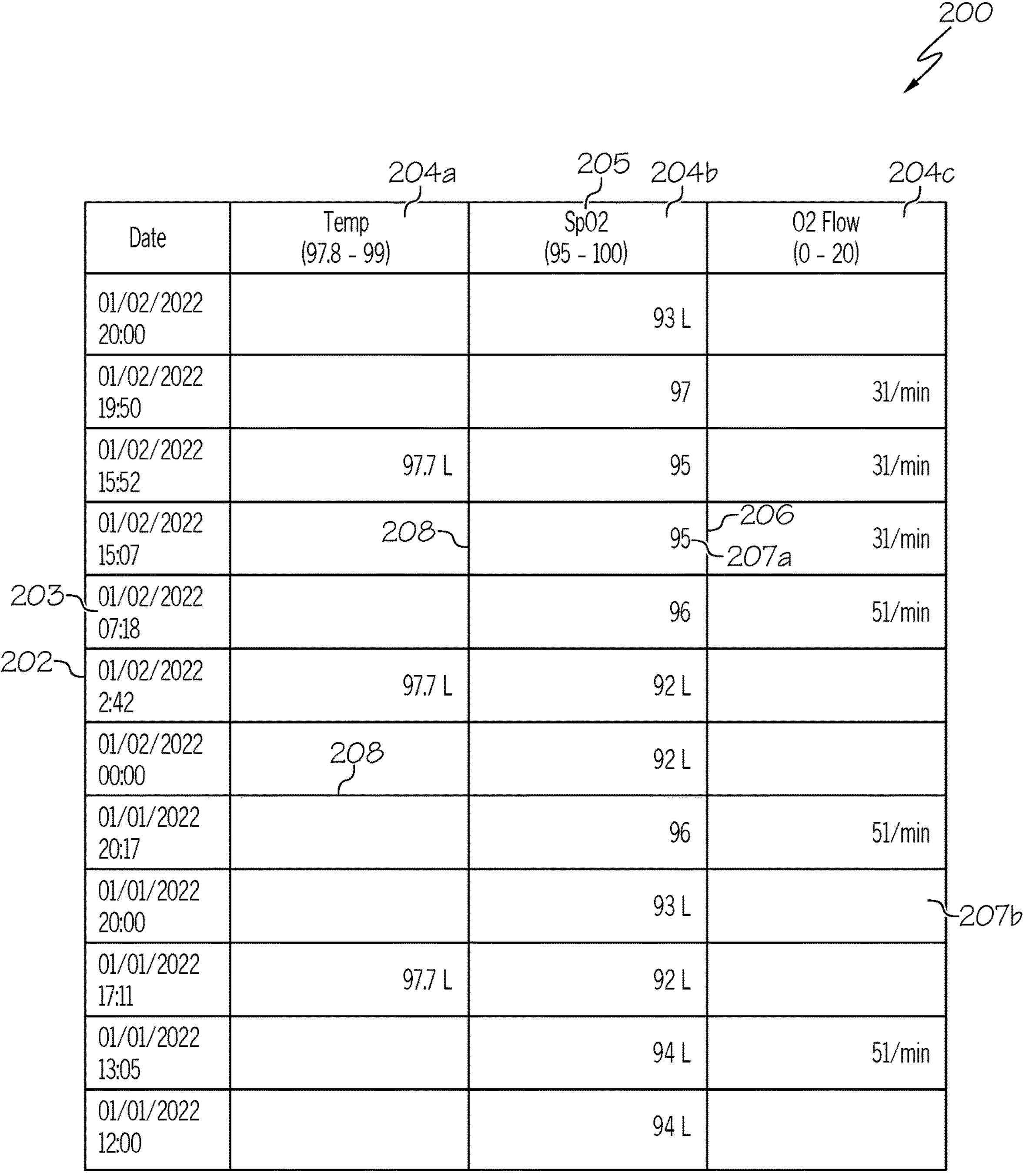
FIG. 2A is an example table comprising tabular data, according to some embodiments of the disclosure.

FIG. 2A is an example table 200 comprising tabular data in the forms of row header cells 202, column header cells 204*a-c*, and value cells 206, according to some embodiments of the disclosure. The row header cells 202 comprise data in the form of row headers 203, and the column header cells 204 comprise data in the form of column headers 205. Value cells 206 in the example table may contain data in the form of values 207*a*, or may be empty and contain no data, such as in cells 207*b*. Table 200 includes borders 208 around each cell, but the systems and methods herein may be applied to tables that do not include borders 208. Table 200 is extracted from an example document detailing an individual's medical details over a period of time, such as temperature (Temp) 204*a*, oxygen saturation (SpO2) 204*b*, and oxygen flow (O2 flow) 204*c*. Conventional OCR techniques simply concatenate the data present in the table to arrive at, for example, a text chunk such as the following: Temp Spo2 02 Flow Date [97.8-99] [95-100] [0-20] Jan. 2, 2022 93 L 20:00 Jan. 2, 2022 97 31/min 19:50 Jan. 2, 2022 97.7 L 95 31/min 15:52 Jan. 2, 2022 95 31/min 15:07 Jan. 2, 2022 96 51/min 07:18 Jan. 2, 2022 97.7 L 92 L 02:42 Jan. 2, 2022 92 L 00:00 Jan. 1, 2022 96 51/min 20:17 Jan. 1, 2022 93 L 20:00 Jan. 1, 2022 97.7 L 92 L 17:11 Jan. 1, 2022 94 L 51/min 13:05 Jan. 1, 2022 94 L 12:00 Jan. 1, 2022 90 L 08:00.

As can be seen, via conventional OCR, it becomes difficult to interpret the tabular data after it has been processed. There is no indication of relationship of values and textual context such as row headers and column headers. To resolve this disconnect between values and their context, a bounding box elongation operation is used, as exemplified in the figures described below.

Figure 2B:
FIG. 2B is an example table comprising tabular data in bounding boxes, according to some embodiments of the disclosure.

FIG. 2B is an example table comprising tabular data in bounding boxes, according to some embodiments of the disclosure. Bounding boxes are rectangles used in document and image processing to bound a chunk of text identified as separate and distinct from adjacent text, and may be prepared by, for example, machine learning models trained to identify text in documents and images and built into the document processing platform 115. In FIG. 2B, table 200 is shown with bounding boxes around each cell identified by, for example, a machine learning model in document processing platform 115. Bounding box 210 is an example bounding box formed around a value cell, the particular example value cell comprising the text "96." The value cell comprising the text "96" is associated with the column header "SpO2 [95-100]" indicated in bounding box 220 and the row header "Jan. 2, 2022 07:18" indicated in bounding box 230. A rule-based bounding box classification algorithm in document-processing platform 115 may be used to determine which cells comprise row headers and column headers. The algorithm may, in one example, include a Named Entity Recognition (NER) model that includes an exhaustive list of clinical entities. The model receives text chunks present inside particular bounding boxes and identifies whether the text chunk includes an entity in the list of clinical entities. Dates may be identified by a regular expression (RegEx) pattern model to determine a match pattern in text chunks that are recognized as a date. Where a text chunk is found that includes a date, the bounding box associated with that text chunk may be identified as a row or column header. As demonstrated above, conventional OCR does not typically allow for this association to be easily ascertained. The bounding box elongation operation allows for this association to be made, as described below.

FIG. 2A and the following figures are directed to multiple entity-multiple row header tables, which may be referred to as multiple entity-multiple date tables as row headers are frequently dates or other timestamps, particularly in a medical environment. Entities may be a term for data entities monitored at each date or timestamp, and correspond to column headers. Multiple entity-multiple date tables will include multiple column headers separated by vertical lines or large blank spaces.

For a table consisting of multiple entities and multiple dates, the entities may be assumed to lie in the first row across several columns as column headers. Vertical lines are detected in the table to determine how far the individual entity's bounding boxes should be extended horizontally. Once the vertical lines are established, each column header's bounding box is extended to what is established as column divider line. Thus, column header bounding boxes is elongated over the entire region of the respective column header. Column header names and values need not be aligned in a single vertical line. Column header text may be center-aligned in the table cell while values can be left, right or center-aligned in their respective cells. When the alignment differs between column headers and values, extending the column header's bounding box across its entire region ensures that the corresponding values will intersect with the bounding box, as further described below.

For a table consisting of a single entity, it may be assumed by the processing algorithm that the entity lies in the first row and spans across all the columns of the table. The bounding box of the entity is elongated so that it covers the entire width of the table. Then each bounding box consisting of values is extended horizontally across the entire table width as well as vertically over the entire table height as described below in a similar fashion to a multiple entity-multiple data table.

Figure 3A:
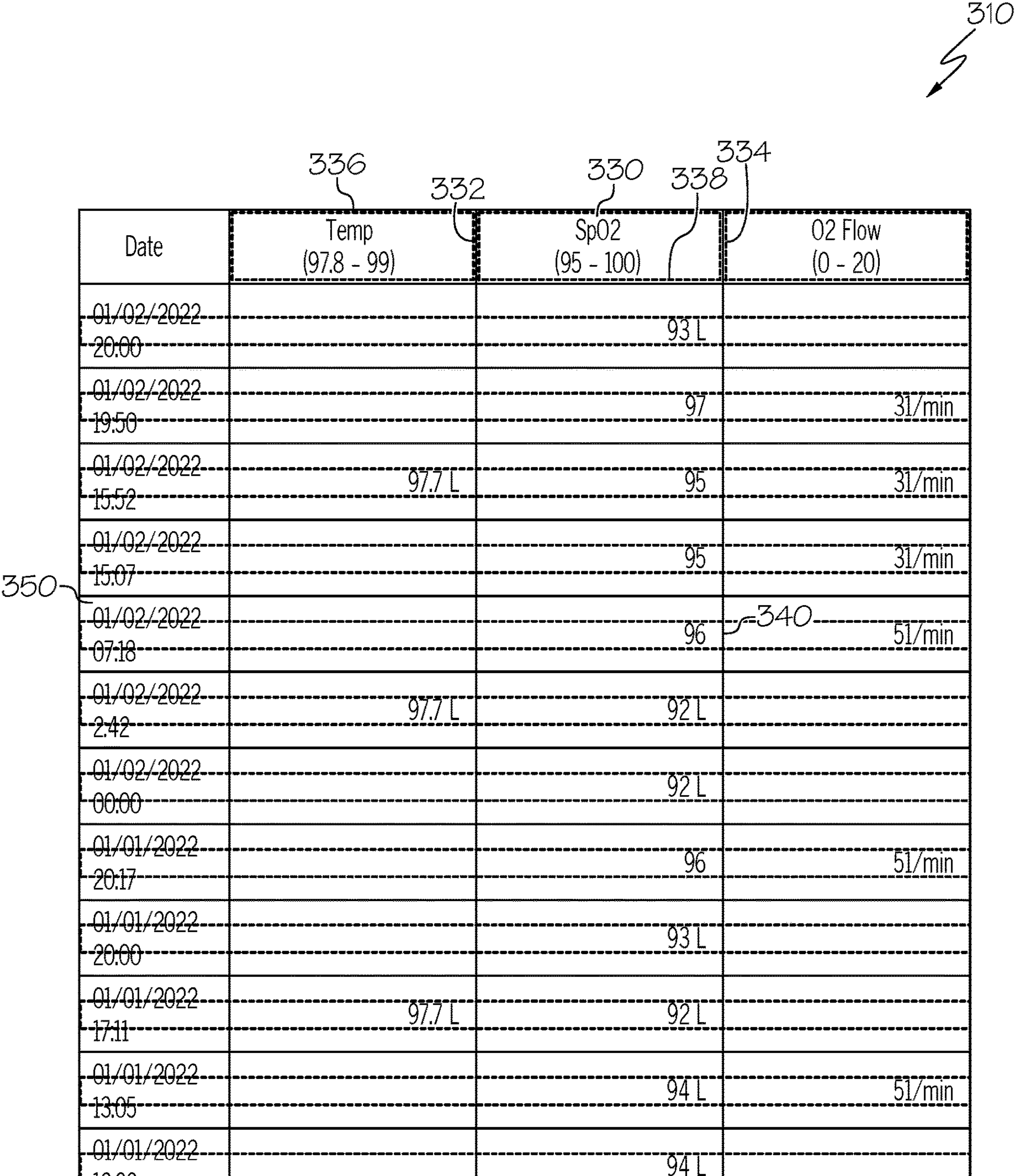
FIG. 3A is an example table comprising tabular data with bounding boxes horizontally elongated, according to some embodiments of the disclosure.

FIG. 3A is an example table 310 comprising tabular data with bounding boxes horizontally elongated, according to some embodiments of the disclosure. In bordered tables, such as the table 310 shown in FIG. 3A, a first step in bounding box elongation is detecting horizontal and vertical lines in a table. When those lines are identified, a cell may be determined to reside in the space defined by two consecutive horizontal lines and two consecutive vertical lines. For example, elongated bounding box 330 has been elongated as compared to bounding box 220 to include all of the space between vertical lines 332 and 334 and horizontal lines 336 and 338. Similar operations may be performed for all row header and column header cells and bounding boxes. In the example shown in FIG. 2B, the method had identified the two lines of text "SpO2" and "[95-100]" in a single bounding box 220. However, in the event that two separate bounding boxes were originally applied, e.g., "SpO2" had been provided a first bounding box and "[95-100]" had been provided a second bounding box, a post-processing algorithm in document processing platform 115 would identify that the text in two separate bounding boxes are both in the elongated bounding box 330 defined by the horizontal and vertical lines, and would merge the text content of both bounding boxes into the elongated bounding box 330. It is often the case that separate lines of text in a document are provided separate bounding boxes. To capture the entire text present in a cell, even when the text in a cell spans multiple lines, a bounding box is formed by an algorithm in document processing platform 115 that spans the entire cell. This is done by using a line detection algorithm as described above to determine positional information of the horizontal and vertical lines that spatially define the cells within a table in the document. CascadeTabNet is an example of a line detecting algorithm that may be used in conjunction with the techniques described herein.

Thus, all data within a cell is merged into a single bounding box defining the entire cell. Once all cells are defined by separate bounding boxes, a bounding box classification algorithm is executed to differentiate between bounding boxes representing, value, row header and column header, and create a mapping between bounding box and its class label accordingly. Finally all bounding boxes belonging to a class label such as "row header," "value," or "column header" are formed by a bounding box algorithm to provide enlarged bounding boxes for all individual bounding boxes of the same category.

In unbordered tables, though there are no horizontal and vertical lines to identify, a post-processing algorithm in document processing platform 115 may identify blank spaces in between columns and rows and an elongated bounding box may be elongated such that two consecutive cells of data touch in the blank space between the column and row. These blank spaces (or gaps) denote imaginary column and row lines which could have been present had it been a bordered table. The column headers may be identified by processing the first row in the table. Following the column headers and the corresponding gaps or blank spaces between them, a dictionary may be used to group all the cell content in the entire table under each column header. Thus, key-value pairs may be stored in the dictionary where key denotes the column header and value denotes a list of items which belong to the corresponding column header in the table.

In FIG. 3A, the bounding boxes for value cells have also been horizontally elongated, such as elongated bounding box 340, to match each cell that is classified as a value cell to a corresponding cell that is identified as a row header cell, such as row header cell 350. The classification of a cell as a row header cell is performed by the rule-based classification algorithm. To fully contextualize a value cell, it may also be matched with a column header cell.

Figure 3B:
FIG. 3B is an example table comprising tabular data with bounding boxes vertically elongated, according to some embodiments of the disclosure.

FIG. 3B is an example table comprising tabular data with bounding boxes vertically elongated, according to some embodiments of the disclosure, to match a value cell with a corresponding cell that is identified as a column header cell. In this example, the bounding box 210 (as shown in FIG. 2B) for an identified value cell is elongated vertically by extending the top edge of the bounding box of the value cell until it overlaps with a column header cell to form elongated bounding box 360.

Figure 4A:
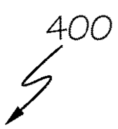
FIG. 4A is an example table comprising tabular data with value cells matched to row header and column header cells, according to some embodiments of the disclosure.

FIG. 4A is an example table comprising tabular data with value cells matched to row header and column header cells, according to some embodiments of the disclosure. Combining the horizontal and vertical bounding box elongation described in FIGS. 3A and 3B, a bounding box for a value cell may be matched with corresponding bounding boxes for a row header cell and a column header cell. In the example shown in FIG. 4A, value cell 420 has bounding boxes horizontally and vertically elongated by the methods described in FIGS. 3A and 3B to determine that it is matched with the column header cell corresponding to bounding box 430 and the row header cell corresponding to bounding box 440.

Region 450 is the intersection of the vertically extended bounding box for value cell 420 and bounding box 430, and region 460 is the intersection of the horizontally extending bounding box for value cell 420 and bounding box 440. Advantageously, the region 450 need not include all of the bounding box 430 for the column header cell, but just a portion thereof. Using vertical and horizontal lines to elongate the bounding boxes for column header cells in bordered tables allows for ensuring that all elongated bounding boxes for a value cell in a table intersect with at least one and only one elongated bounding box for a column header cell. Similarly, using vertical and horizontal lines to elongate the bounding boxes for row header cells in bordered tables allows for ensuring that all elongated bounding boxes for a value cell in a table intersect with at least one and only one elongated bounding box for a row header cell. Likewise, rather than vertical and horizontal lines, blank spaces between row header data and column header data may be used to elongate the bounding boxes for column header cells and row header cells, thereby ensuring that all elongated bounding boxes for a value cell in a table intersect with at least one elongated bounding box for a column header cell and at least one elongated bounding box for a row header cell.

Figure 4B:
FIG. 4B is an example set of serialized data tuples output by systems and methods according to some embodiments of the disclosure.

FIG. 4B is an example set 470 of serialized data tuples output by the systems and methods according to some embodiments of the disclosure. For each value cell in the table, a data tuple may be generated, the data tuple including three elements taking the form <Row header, Value, Column header>, such that the data tuple comprises a row header element, a column header element, and a value element. The row header element corresponds to a value in the row header cell that corresponds to the value cell, the column header element corresponds to a value in the column header cell that corresponds to the value cell, and the value element corresponds to the value in the value cell. In the table shown in FIG. 4A, there are 21 values in value cells (three in the "Temp" column, twelve in the "SpO2" column, and six in the "02 flow" column). As such, the serialized set 470 includes 21 tuples, one for each value cell. Tuple 480, for example, is the tuple for the value cell 420, taking the form <'Jan. 2, 2022 07:18', '96', 'SpO2 [95-100]'>. This tuple 480 represents that value cell "96" corresponds to the row header "Jan. 2, 2022 07:18" and the column header "SpO2 [95-100]." Advantageously, the remaining blank value cells in the table may be ignored by the bounding box elongation operation.

Figure 4C:
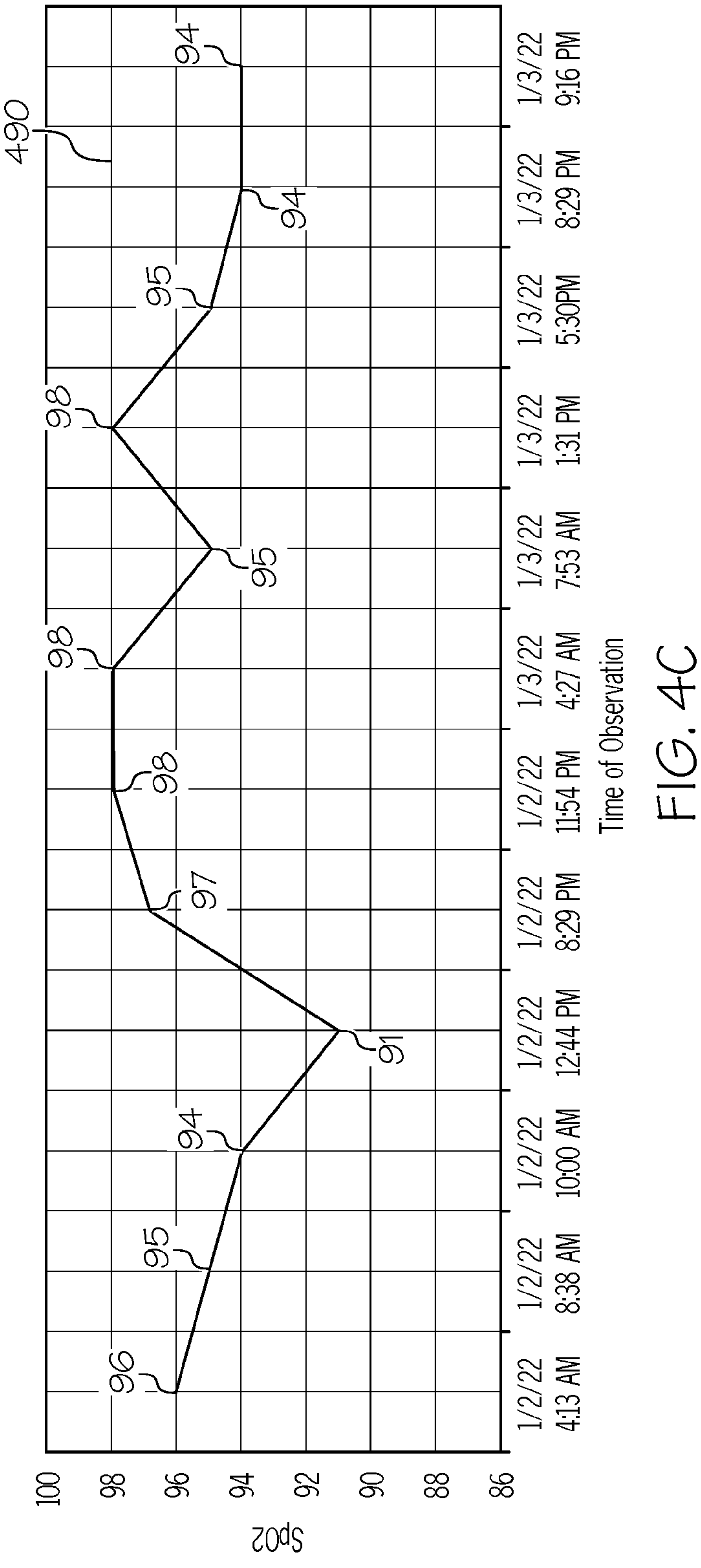
FIG. 4C is an example graph generated from serialized data tuples output by systems and methods according to some embodiments of the disclosure.

Once the serialized data set 470 is extracted from the input table, document processing platform 115 may be better equipped to use the data output. For example, FIG. 4C is an example graph 490 generated from serialized data tuples output by some embodiments of the disclosure. Specifically, the graph 490 shows a change in blood oxygen levels (SpO2) over a time period based on the values captured in the serialized data set.

Figure 5:
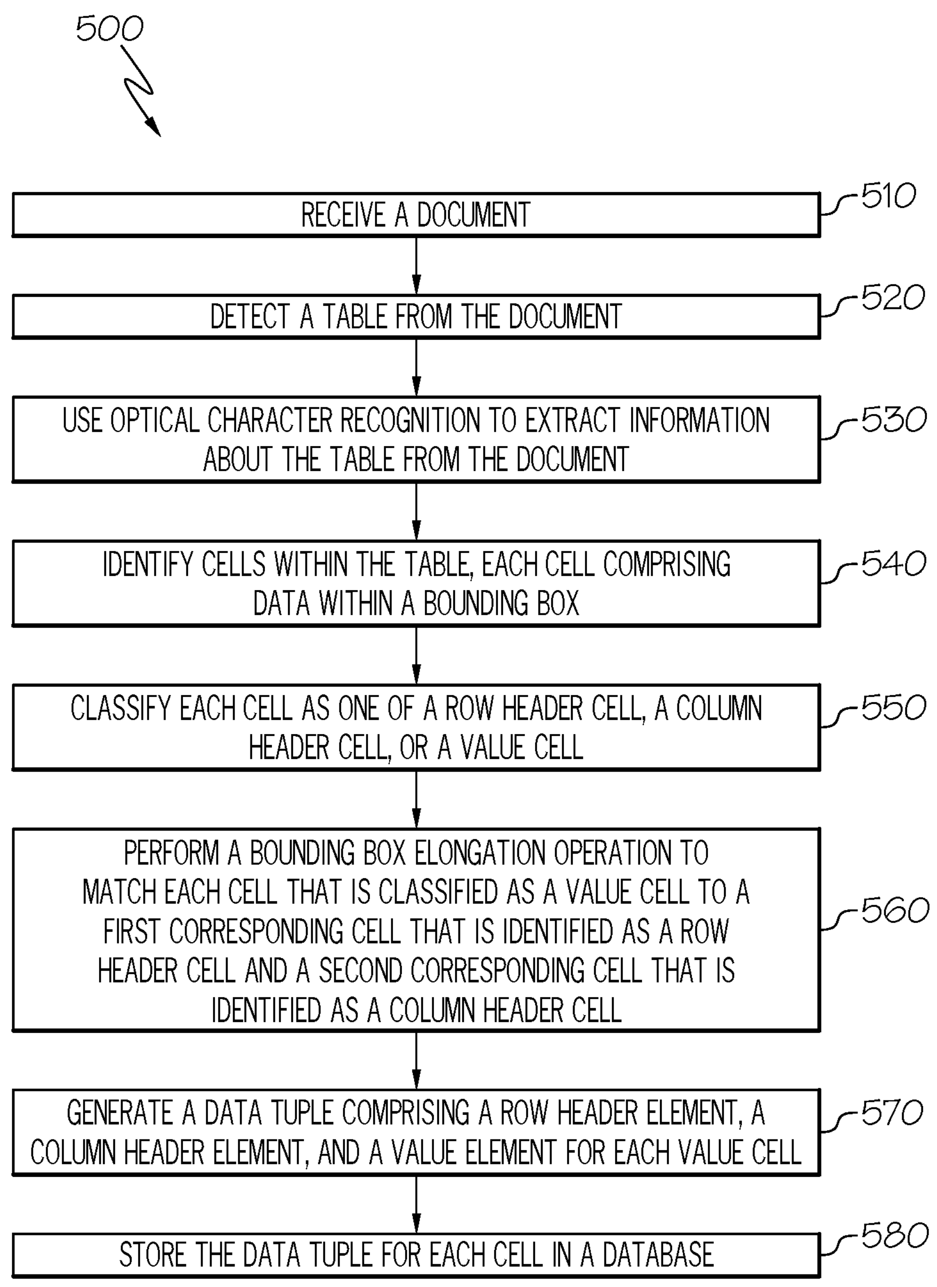
FIG. 5 is a flowchart showing a method for processing a document, according to some embodiments of the disclosure.

FIG. 5 is a flowchart showing a method 500 for processing a document, according to some embodiments of the disclosure. The method 500 may be a computer-implemented method for extracting tabular data from a document by one or more processors, implemented on a system comprising at least one memory storing instructions and at least one processor executing the instructions to perform a series of operations. A computer-readable medium may store the instructions executable by the one or more processors. In one embodiment, the document processing platform 115 performs the method 500. At Step 510, a document is received by the document processing platform 115. At this stage, the communication infrastructure 105 facilitates the transfer of one or more documents 110 into and/or through the network environment 100. The received document is then subject to pre-processing by the document processing platform 115. This pre-processing phase, in some embodiments, entails the division of the document into individual pages, thus breaking down the overall content into manageable units for subsequent processing stages.

During this process, the document processing platform 115 is further configured to extract the inherent metadata from the document. Metadata extraction involves the retrieval of additional data attributes, such as the title of the document, the author, and the publication date, amongst other elements. These extracted data attributes provide context and contribute to a comprehensive understanding of the document's provenance and content.

It should be noted that the document processing platform 115 may accommodate a variety of document formats, including but not limited to PDF, DOCX, TXT, RTF, HTML, or the like. This ensures that the document processing platform 115 is capable of processing a wide array of document types, thus enhancing its versatility and applicability in diverse use cases.

The document receiving and pre-processing operations are executed by the processor of the document processing platform 115. The processor is responsible for implementing the prescribed algorithmic operations and managing the computational resources to ensure efficient and accurate processing of the document. The processed data is then ready to be passed on to the next stage of the document processing methodology, wherein further detailed analyses are performed to extract and organize the content of the document.

At step 520, the method includes detecting a table in the document. This may be accomplished by a module in document processing platform 115 for determining section information for the document. The section information includes, in some embodiments, one or more sections, each section including a section bounding box. In this step 520, a section identification module in document processing platform 115 recognizes each distinct section present within document 110. A 'section,' as utilized in this context, represents a distinct partition or constituent of document 110, the distinction of which, in some embodiments, is rendered by the kind of content it embodies or the spatial relationship of content within the document. Sections identified are not restricted to, but may incorporate headings, paragraphs, images, tables, lists, or similar entities. In certain embodiments, a section is a conceptual representation of data and/or text sharing contextual correlation, such as a section enlisting diagnoses in a medical document. Each of these sections associates with a section bounding box delineating the spatial extent of the section within the layout of a page of document 110.

The section identification module determines section information, encompassing the type of each section and the affiliated section bounding box. This information serves to conceptually provide a spatial and typographical blueprint of document 110, augmenting a holistic understanding of the document structure. Furthermore, the section identification module conducts analysis of the visual and textual hierarchy of sections within document 110. This analysis includes comprehension of relationships and order amongst distinct sections based on position, size, style, and additional visual characteristics, as well as textual properties such as the order of paragraphs or subsections, the nesting of list items, the arrangement of cells within a table, or similar attributes.

Certain embodiments incorporate machine learning models to carry out section identification within documents. These models, situated in the section identification module, undergo training on a substantial corpus of annotated documents to discern various section types, such as headings, paragraphs, and tables. The models utilize visual cues (for instance, position, size, color) and textual attributes (for instance, font size, style, bold or italic usage) for section identification. Based on task complexity, diverse model architectures may be employed. Convolutional Neural Networks (CNNs) may be employed to process visual data, while Recurrent Neural Networks (RNNs) or Transformer models manage sequential or context-based text data. In some embodiments, these machine learning models also infer the hierarchical relationship amongst sections based on learned structural rules of documents. For instance, a model might identify a bolded text at the top as a heading and subsequent indented text as its paragraph. The prediction outputs of the machine learning models are refined and validated by the processor, thereby yielding efficient and accurate section identification across diverse document formats. This data is stored in database 120 for future document processing steps. The section identification module, in some embodiments, performs these operations under the control of the processor within the document processing platform 115. The resulting section information, including the section bounding boxes and the analyzed hierarchy, are stored in the database 120 for subsequent steps of the document processing methodology.

At steps 530 and 540, the method includes using optical character recognition (OCR) to extract information about the table from the document 110, including cells within the table and bounding boxes around each cell. These steps may be performed by the section identification module, which determines section information, encompassing the type of each section and the affiliated section bounding box. Tables and cells within tables may both be identified by the section identification module within document processing platform 115. This information serves to conceptually provide a spatial and typographical blueprint of document 110, augmenting a holistic understanding of the document structure. Furthermore, the section identification module conducts analysis of the visual and textual hierarchy of sections within document 110. This analysis includes comprehension of relationships and order amongst distinct sections based on position, size, style, and additional visual characteristics, as well as textual properties such as the arrangement of cells within a table.

At step 550, the document processing platform 115 may further include a classification module for determining whether an identified cell within a table is a value cell, a row header cell, or a column header cell. The determination of row header cell and column header cell may be rule-based or based on a machine learning model. Each cell not identified as a row header cell or a column header cell is determined to be a value cell. Blank cells may be ignored. Certain embodiments incorporate machine learning models to carry out cell classification. These models, situated in the document processing platform, undergo training on a substantial corpus of annotated documents to discern various types of tables to determine row headers and column headers. The models utilize visual cues (for instance, position, size, color) and textual attributes (for instance, font size, style, bold or italic usage) for header identification. Based on task complexity, diverse model architectures may be employed. Convolutional Neural Networks (CNNs) may be employed to process visual data, while Recurrent Neural Networks (RNNs) or Transformer models manage sequential or context-based text data. In some embodiments, these machine learning models also infer the hierarchical relationship amongst cells in tables based on learned structural rules of documents. For instance, a model might identify a bolded text at the top as a heading and subsequent indented text as its values. The prediction outputs of the machine learning models are refined and validated by the processor, thereby yielding efficient and accurate cell classification across diverse document formats. This data is stored in database 120 for future document processing steps. The resulting header information, including the section bounding boxes and the analyzed hierarchy, are stored in the database 120 for subsequent steps of the document processing methodology.

At step 560, a bounding box elongation operation is performed to match each cell that is classified as a value cell to a first corresponding cell that is identified as a row header cell and a second corresponding cell that is identified as a column header cell. The bounding box elongation operation may comprise first determining top, bottom, left, and right edges of the bounding box for the cell classified as a value cell. The edges may be defined by corners of a rectangular bounding box defined by Cartesian coordinates such as x1, y1, x2, and y2. In some instances, row headers may be found in the furthest left column and the column headers may be found in the topmost row of a table. In these cases, the bounding box elongation comprises extending the left edge of the bounding box of the cell classified as a value cell until it overlaps with a row header cell, and extending the top edge of the bounding box of the value cell until it overlaps with a column header cell. With reference to the Cartesian coordinates, this may result in a horizontally elongated bounding box comprising coordinates 0, y1, x2, and y2, and a vertically elongated bounding box comprising coordinates x1, 0, x2, and y2.

In some embodiments, the row header may be identified as the rightmost column or in rarer instances, a column in the middle of a table. Similarly, a column header may be in the bottommost row or a row in the middle of a table. To account for these possibilities, the horizontally and vertically elongated bounding boxes may be extended to the dimensions of the entire table. For instances, the horizontally elongated box may comprise coordinates 0, y1, W, y2, where W is the horizontal width of the table. In this case, the four corners of the horizontally elongated bounding box would be (0, y1), (0, y2), (W, y1), and (W, y2), where the original bounding box for the value cell had corners (x1, y1), (x1, y2), (x2, y1), and (x2, y2). Similarly, the vertically elongated bounding box would have corners (x1, 0), (x1, L), (x2, 0), and (x2, L), where L is the length of the table in the vertical direction. In both instances, (0,0) is the coordinates for the bottom left corner of the table. An R-tree data structure may be used to determine the corresponding row header and column header cells in the bounding box elongation operation. R-tree data structures are geo-spatial data structures that group all elements within a single bounding box together in a query box such that a query will yield the other elements in the R-tree query box. As applied to the present invention, an R-tree data structure treats the vertically elongated bounding box of a value cell as a first R-tree query box, and that first R-tree query box includes both the bounding box for the value cell and the bounding box for a first corresponding cell that is identified as the column header cell. As such, a query within this first query box for a column header cell will indicate the column header cell that matches the pertinent value cell. Similarly, the horizontally elongated bounding box for a value cell is a second R-tree query box in the R-tree data structure and matches the value cell to a corresponding row header column cell. R-tree data structures are an efficient form of geo-spatial indexing.

Intersection over Union (IoU) metrics are another form of matching value cells to their corresponding column header cell and row header cell that may be used in conjunction with the R-tree data structures or instead of the R-tree data structures. Intersection over Union is a term used to describe the extent of overlap between two bounding boxes and may be useful in situations where the bounding boxes do not perfectly overlap. For example an elongated bounding box for a value cell may intersect with two different row header cell bounding boxes or two different column header cell bounding boxes. Using pure R-tree data structure techniques, there may not be a single bounding box that is completely in the query box. However, the IoU technique provides an option to calculate an IoU of all potential corresponding cells to determine the cell with the highest IoU as the matching cell. For example, a value cell may have a bounding box that is vertically extended and intersects with the bounding box for a first column header cell, e.g., SpO2 and a second column header cell, e.g., BMI. A pure R-tree query may be unable to resolve which column header cell is the matching cell for the value cell in question. However, using IoU methods, the area of overlap between the query box and each bounding box for each column header cell is calculated. Whichever cell has a higher IoU, e.g., a greater area of intersection with the query box, may be determined to be the column header cell that corresponds to the value cell. Similarly, this technique may be applied to a horizontally elongated bounding box for a value cell that intersects with the bounding boxes for two different row header cells. IoU methods may also be used independently of R-tree methods.

At step 570, a serialized set of data tuples is generated. For each value cell in the table, a data tuple may be generated, the data tuple including three elements taking the form <Row header, Value, Column header>, such that the data tuple comprises a row header element, a column header element, and a value element. The row header element corresponds to a value in the row header cell that corresponds to the value cell, the column header element corresponds to a value in the column header cell that corresponds to the value cell, and the value element corresponds to the value in the value cell.

At step 580, the serialized set of data tuples is stored in database 120. allowing for improved data processing and accessibility. For example, as discussed above, a table may contain two entities such as blood oxygen saturation (SpO2) and body mass index (BMI) measured over the course of ten days. BMI may have been measured every day for the ten days, while SpO2 was measured only two times over the ten day period. The serialized data set would have ten data triplets for BMI with a format <Date, Value, BMI> with value being the measured BMI on a corresponding date, and the serialized data set would have just two data triplets for SpO2 with a format <Date, Value, SpO2>, with the value being the measured SpO2 on a corresponding date. In a conventional data processing system, converting the table to a tabular data structure would result in a data structure that included ten rows each for BMI and SpO2. Thus, serializing the data set into triplet tuples improves the computational efficiency and resource intensity associated with data extraction and processing by reducing the number of data sets extracted (from ten for SpO2 to two), and removing the additional step present in the conventional techniques of filtering for only non-null values for SpO2. These triplets can be later fed to one or more machine learning models to build, for example, knowledge graphs out of the table, solve question-answering tasks based on the table information, and other advantageous downstream functionalities.

Furthermore, the serialized data tuples may allow for improvements in the creation of time-series databases. For example, in a medical context, this may allow for a creation of a time-series database for patients' medical information, such as vitals, medicines and their dosage, medical tests and their values. For example, a table may contain vitals, such as SpO2 and BMI, and a variety of medical tests such as levels for glycated hemoglobin (HbA1C), red blood cells (RBC), and white blood cells (WBC), which are also reported over time. A time-series database containing values of these entities over time may help identify how patients are responding to the care they are receiving. For example, analyzing the trend of HbA1C over time would help a practitioner understand how the sugar levels of a patient are evolving over time and if the patient needs any intervention. Such a database would also help users understand if HbA1C levels of a patient improved once the intervention was given.

Figure 6:
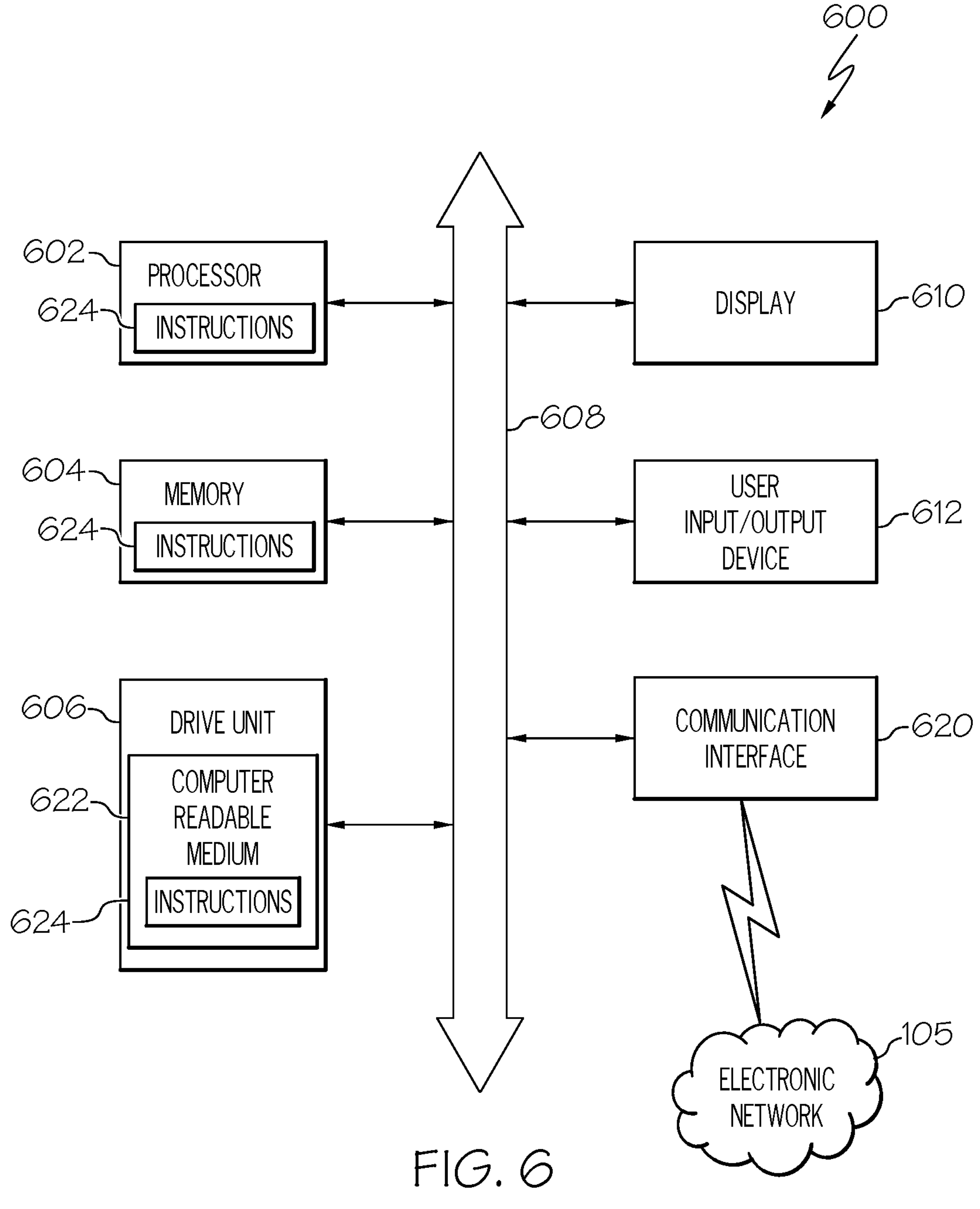
FIG. 6 illustrates an implementation of a computer system that executes techniques presented herein, according to some embodiments of the disclosure.

FIG. 6 illustrates an implementation of a computer system that executes techniques presented herein. The computer system 600 includes a set of instructions that are executed to cause the computer system 600 to perform any one or more of the methods or computer based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 is implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 is a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (i.e., programmed).

The computer system 600 includes a memory 604 that communicates via bus 608. The memory 604 is a main memory, a static memory, or a dynamic memory. The memory 604 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein are performed by the processor 602 executing the instructions stored in the memory 604. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 600 further includes a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in the drive unit 606.

Additionally or alternatively, the computer system 600 includes an input/output device 612 configured to allow a user to interact with any of the components of the computer system 600. The input/output device 612 is a number pad, a keyboard, a cursor control device, such as a mouse, a joystick, touch screen display, remote control, or any other device operative to interact with the computer system 600.

The computer system 600 also includes the drive unit 606 implemented as a disk or optical drive. The drive unit 606 includes a computer-readable medium 622 in which one or more sets of instructions 624, e.g. software, is embedded. Further, the sets of instructions 624 embodies one or more of the methods or logic as described herein. The sets of instructions 624 resides completely or partially within the memory 604 and/or within the processor 602 during execution by the computer system 600. The memory 604 and the processor 602 also include computer-readable media as discussed above.

In some systems, computer-readable medium 622 includes the set of instructions 624 or receives and executes the set of instructions 624 responsive to a propagated signal so that a device connected to network 105 communicates voice, video, audio, images, or any other data over the network 105. Further, the sets of instructions 624 are transmitted or received over the network 105 via the communication port or interface 620, and/or using the bus 608. The communication port or interface 620 is a part of the processor 602 or is a separate component. The communication port or interface 620 is created in software or is a physical connection in hardware. The communication port or interface 620 is configured to connect with the network 105, external media, the display 610, or any other components in the computer system 600, or combinations thereof. The connection with the network 105 is a physical connection, such as a wired Ethernet connection, or is established wirelessly as discussed below. Likewise, the additional connections with other components of the computer system 600 are physical connections or are established wirelessly. The network 105 alternatively be directly connected to the bus 608.

While the computer-readable medium 622 is shown to be a single medium, the term "computer-readable medium"

includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 622 is non-transitory, and may be tangible.

The computer-readable medium 622 includes a solid-state memory such as a memory card or other package that houses one or more non-volatile read-only memories. The computer-readable medium 622 is a random-access memory or other volatile re-writable memory. Additionally or alternatively, the computer-readable medium 622 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 600 is connected to the network 105. The network 105 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. The network 105 includes wide area networks (WAN), such as the Internet, local area networks (LAN), campus area networks, metropolitan area networks, a direct connection such as through a Universal Serial Bus (USB) port, or any other networks that allows for data communication. The network 105 is configured to couple one computing device to another computing device to enable communication of data between the devices. The network 105 is generally enabled to employ any form of machine-readable media for communicating information from one device to another. The network 105 includes communication methods by which information travels between computing devices. The network 105 is divided into sub-networks. The sub-networks allow access to all of the other components connected thereto or the sub-networks restrict access between the components. The network 105 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method for extracting tabular data from a document comprising: detecting, by one or more processors, a table from the document; extracting, by the one or more processors, information about the table from the document; identifying, by the one or more processors, cells within the table, each cell comprising a bounding box; classifying, by the one or more processors, each cell as one of: a value cell, a row header cell, or a column header cell; performing, by the one or more processors, a bounding box elongation operation to match each cell that is classified as a value cell to a first corresponding cell that is identified as a row header cell and a second corresponding cell that is identified as a column header cell; for each cell classified as a value cell, generating, by the one or more processors, a data tuple comprising a row header element, a column header element, and a value element, wherein the row header element corresponds to a first value in the first corresponding cell, the column header element corresponds to a second value in the second corresponding cell, and the value element corresponds to a third value in the value cell; and storing, by the one or more processors, the data tuple for each cell classified as a value cell in a database.

Example 2. The computer-implemented method of example 1, wherein the bounding box elongation operation comprises: determining top, bottom, left, and right edges of the bounding box for the cell classified as a value cell; extending the left edge of the bounding box of the cell classified as a value cell until it overlaps with a row header cell; and extending the top edge of the bounding box of the value cell until it overlaps with a column header cell.

Example 3. The computer-implemented method of any of the preceding examples, wherein the bounding box elongation operation comprises: extending the bounding box for the cell classified as a value cell horizontally to form a horizontally elongated bounding box for the cell classified as a value cell; and extending the bounding box for the cell classified as a value cell vertically to form a vertically elongated bounding box for the cell classified as a value cell.

Example 4. The computer-implemented method of any of the preceding examples, wherein an R-tree data structure is used to match each cell that is classified as a value cell to the first corresponding cell and the second corresponding cell.

Example 5. The computer-implemented method of example 3, wherein the first corresponding cell is determined by an intersection with the horizontally elongated bounding box, and the second corresponding cell is determined by an intersection with the vertically elongated bounding box.

Example 6. The computer-implemented method of any of the preceding examples, wherein the bounding box elongation operation comprises identifying vertical lines and horizontal lines in the table.

Example 7. The computer-implemented method of any of the preceding examples, wherein the bounding box elongation operation comprises identifying gaps between columns.

Example 8. The computer-implemented method of any of the preceding examples, wherein a number of data tuples generated is equal to a number of value cells identified in the table.

Example 9. A system for extracting tabular data from a document, the system comprising: at least one memory storing instructions; and at least one processor executing the instructions to perform operations including: detecting a table from a document; extracting information about the table from the document; identifying cells within the table, each cell comprising a bounding box; classifying each cell as one of: a value cell, a row header cell, or a column header cell; performing a bounding box elongation operation to match each cell that is classified as a value cell to a first corresponding cell that is identified as a row header cell and a second corresponding cell that is identified as a column header cell; for each cell classified as a value cell, generating a data tuple comprising three elements: a row header element, a column header element, and a value element; wherein the row header element corresponds to a first value in the first corresponding cell, the column header element corresponds to a second value in the second corresponding cell, and the value element corresponds to a third value in the value cell; and storing the data tuple for each cell classified as a value cell in a database.

Example 10. The system of example 9, wherein the bounding box elongation operation comprises: determining top, bottom, left, and right edges of the bounding box for the cell classified as a value cell; extending the left edge of the bounding box of the cell classified as a value cell until it overlaps with a row header cell; and extending the top edge of the bounding box of the value cell until it overlaps with a column header cell.

Example 11. The system of any of examples 9-10, wherein the bounding box elongation operation comprises: extending the bounding box for the cell classified as a value cell horizontally to form a horizontally elongated bounding box for the cell classified as a value cell; and extending the bounding box for the cell classified as a value cell vertically to form a vertically elongated bounding box for the cell classified as a value cell.

Example 12. The system of any of examples 9-11, wherein an R-tree data structure is used to match each cell that is classified as a value cell to the first corresponding cell and the second corresponding cell.

Example 13. The system of example 11, wherein the first corresponding cell is determined by an intersection with the horizontally elongated bounding box, and the second corresponding cell is determined by an intersection with the vertically elongated bounding box.

Example 14. The system of any of examples 9-13, wherein the bounding box elongation operation comprises identifying vertical lines and horizontal lines in the table.

Example 15. The system of any of examples 9-14, wherein the bounding box elongation operation comprises identifying gaps between columns.

Example 16. The system of any of examples 9-15, wherein a number of data tuples generated is equal to a number of value cells identified in the table.

Example 17. A non-transitory computer readable medium storing instructions which, when executed by one or more processors, cause the one or more processors to perform operations comprising: detecting a table from a document; extracting information about the table from the document; identifying cells within the table, each cell comprising a bounding box; classifying each cell as one of: a value cell, a row header cell, or a column header cell; performing a bounding box elongation operation to match each cell that is classified as a value cell to a first corresponding cell that is identified as a row header cell and a second corresponding cell that is identified as a column header cell; for each cell classified as a value cell, generating a data tuple comprising three elements: a row header element, a column header element, and a value element; wherein the row header element corresponds to a first value in the first corresponding cell, the column header element corresponds to a second value in the second corresponding cell, and the value element corresponds to a third value in the value cell; and storing the data tuple for each cell classified as a value cell in a database.

Example 18. The non-transitory computer readable medium of example 17, wherein the bounding box elongation operation comprises: determining top, bottom, left, and right edges of the bounding box for the cell classified as a value cell; extending the left edge of the bounding box of the cell classified as a value cell until it overlaps with a row header cell; and extending the top edge of the bounding box of the value cell until it overlaps with a column header cell.

Example 19. The non-transitory computer readable medium of any of examples 17-18, wherein the bounding box elongation operation comprises: extending the bounding box for the cell classified as a value cell horizontally to form a horizontally elongated bounding box for the cell classified as a value cell; and extending the bounding box for the cell classified as a value cell vertically to form a vertically elongated bounding box for the cell classified as a value cell.

Example 20. The non-transitory computer readable medium of any of examples 17-19, wherein an R-tree data structure is used to match each cell that is classified as a value cell to the first corresponding cell and the second corresponding cell.

What is claimed is:

1. A computer-implemented method for extracting tabular data from a document, the method comprising:

detecting, by one or more processors, a table from the document;

extracting, by the one or more processors, information about the table from the document;

identifying, by the one or more processors, cells within the table, each cell comprising a bounding box;

classifying, by the one or more processors, each cell as one of: a value cell, a row header cell, or a column header cell;

iteratively performing, by the one or more processors, a bounding box elongation operation for each cell that is classified as the value cell to match the cell to a first corresponding cell that is identified as a row header cell and a second corresponding cell that is identified as a column header cell;

upon matching the cell to the first corresponding cell and the second corresponding cell by the bounding box elongation operation, generating, by the one or more processors, a data tuple comprising a row header element, a column header element, and a value element, wherein the row header element corresponds to a first value in the first corresponding cell, the column header element corresponds to a second value in the second corresponding cell, and the value element corresponds to a third value in the cell; and storing, by the one or more processors, the data tuple for each cell classified as the value cell in a database.

2. The computer-implemented method of claim 1, wherein the bounding box elongation operation comprises:

determining top, bottom, left, and right edges of the bounding box for the cell classified as the value cell;

extending the left edge of the bounding box of the cell classified as the value cell until it overlaps with a row header cell; and extending the top edge of the bounding box of the cell classified as the value cell until it overlaps with a column header cell.

3. The computer-implemented method of claim 1, wherein the bounding box elongation operation comprises:

extending the bounding box for the cell classified as the value cell horizontally to form a horizontally elongated bounding box for the cell classified as the value cell; and extending the bounding box for the cell classified as the value cell vertically to form a vertically elongated bounding box for the cell classified as the value cell.

4. The computer-implemented method of claim 1, wherein an R-tree data structure is used to match each cell that is classified as the value cell to the first corresponding cell and the second corresponding cell.

5. The computer-implemented method of claim 3, wherein the first corresponding cell is determined by an intersection with the horizontally elongated bounding box, and the second corresponding cell is determined by an intersection with the vertically elongated bounding box.

6. The computer-implemented method of claim 1, wherein the bounding box elongation operation comprises identifying vertical lines and horizontal lines in the table.

7. The computer-implemented method of claim 1, wherein the bounding box elongation operation comprises identifying gaps between columns.

8. The computer-implemented method of claim 1, wherein a number of data tuples generated is equal to a number of value cells identified in the table.

9. A system for extracting tabular data from a document, the system comprising:

one or more non-transitory computer readable media storing instructions; and one or more processors executing the instructions to perform operations including:

detecting a table from a document;

extracting information about the table from the document;

identifying cells within the table, each cell comprising a bounding box;

classifying each cell as one of: a value cell, a row header cell, or a column header cell;

iteratively performing a bounding box elongation operation for each cell that is classified as the value cell to match the cell to a first corresponding cell that is identified as a row header cell and a second corresponding cell that is identified as a column header cell;

upon matching the cell to the first corresponding cell and the second corresponding cell by the bounding box elongation operation, generating a data tuple comprising three elements: a row header element, a column header element, and a value element; wherein the row header element corresponds to a first value in the first corresponding cell, the column header element corresponds to a second value in the second corresponding cell, and the value element corresponds to a third value in the cell; and storing the data tuple for each cell classified as the value cell in a database.

10. The system of claim 9, wherein the bounding box elongation operation comprises:

determining top, bottom, left, and right edges of the bounding box for the cell classified as the value cell;

extending the left edge of the bounding box of the cell classified as the value cell until it overlaps with a row header cell; and extending the top edge of the bounding box of the cell classified as the value cell until it overlaps with a column header cell.

11. The system of claim 9, wherein the bounding box elongation operation comprises:

extending the bounding box for the cell classified as the value cell horizontally to form a horizontally elongated bounding box for the cell classified as the value cell; and extending the bounding box for the cell classified as the value cell vertically to form a vertically elongated bounding box for the cell classified as the value cell.

12. The system of claim 9 wherein an R-tree data structure is used to match each cell that is classified as the value cell to the first corresponding cell and the second corresponding cell.

13. The system of claim 11, wherein the first corresponding cell is determined by an intersection with the horizontally elongated bounding box, and the second corresponding cell is determined by an intersection with the vertically elongated bounding box.

14. The system of claim 9, wherein the bounding box elongation operation comprises identifying vertical lines and horizontal lines in the table.

15. The system of claim 9, wherein the bounding box elongation operation comprises identifying gaps between columns.

16. The system of claim 9, wherein a number of data tuples generated is equal to a number of value cells identified in the table.

17. One or more non-transitory computer readable media storing instructions that, when executed by one or more processors, cause the one or more processors to perform operations comprising:

detecting a table from a document;

extracting information about the table from the document;

identifying cells within the table, each cell comprising a bounding box;

classifying each cell as one of: a value cell, a row header cell, or a column header cell;

iteratively performing a bounding box elongation operation for each cell that is classified as the value cell to match the cell to a first corresponding cell that is identified as a row header cell and a second corresponding cell that is identified as a column header cell;

upon matching the cell to the first corresponding cell and the second corresponding cell by the bounding box elongation operation, generating a data tuple comprising three elements: a row header element, a column header element, and a value element; wherein the row header element corresponds to a first value in the first corresponding cell, the column header element corresponds to a second value in the second corresponding cell, and the value element corresponds to a third value in the cell; and storing the data tuple for each cell classified as the value cell in a database.

18. The one or more non-transitory computer readable media of claim 17, wherein the bounding box elongation operation comprises:

determining top, bottom, left, and right edges of the bounding box for the cell classified as the value cell;

extending the left edge of the bounding box of the cell classified as the value cell until it overlaps with a row header cell; and extending the top edge of the bounding box of the cell classified as the value cell until it overlaps with a column header cell.

19. The one or more non-transitory computer readable media of claim 17, wherein the bounding box elongation operation comprises:

extending the bounding box for the cell classified as the value cell horizontally to form a horizontally elongated bounding box for the cell classified as the value cell; and extending the bounding box for the cell classified as the value cell vertically to form a vertically elongated bounding box for the cell classified as the value cell.

20. The one or more non-transitory computer readable media of claim 17, wherein an R-tree data structure is used to match each cell that is classified as the value cell to the first corresponding cell and the second corresponding cell.

* * * * *